US010619015B2

(12) United States Patent
Humpal et al.

(10) Patent No.: US 10,619,015 B2
(45) Date of Patent: Apr. 14, 2020

(54) MODIFICATION OF SILOXANE POLYOXAMIDE COPOLYMERS WITH ULTRAVIOLET LIGHT

(71) Applicant: 3M INNOVATIVE PROPERTIES COMPANY, St. Paul, MN (US)

(72) Inventors: Paul E. Humpal, Stillwater, MN (US); Audrey A. Sherman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 101 days.

(21) Appl. No.: 16/078,234

(22) PCT Filed: Feb. 23, 2017

(86) PCT No.: PCT/US2017/019014
§ 371 (c)(1),
(2) Date: Aug. 21, 2018

(87) PCT Pub. No.: WO2017/147229
PCT Pub. Date: Aug. 31, 2017

(65) Prior Publication Data
US 2019/0048152 A1    Feb. 14, 2019

Related U.S. Application Data

(60) Provisional application No. 62/299,221, filed on Feb. 24, 2016.

(51) Int. Cl.
| | |
|---|---|
| *C08L 83/04* | (2006.01) |
| *C08J 3/28* | (2006.01) |
| *C08G 77/54* | (2006.01) |
| *C08G 77/455* | (2006.01) |
| *C09J 183/14* | (2006.01) |
| *C08L 83/00* | (2006.01) |
| *C09J 7/40* | (2018.01) |
| *C09J 7/38* | (2018.01) |
| *C08L 83/16* | (2006.01) |
| *C09J 5/00* | (2006.01) |
| *C08G 77/04* | (2006.01) |

(52) U.S. Cl.
CPC ............. *C08J 3/28* (2013.01); *C08G 77/455* (2013.01); *C08G 77/54* (2013.01); *C08L 83/00* (2013.01); *C08L 83/16* (2013.01); *C09J 5/00* (2013.01); *C09J 7/38* (2018.01); *C09J 7/401* (2018.01); *C09J 183/14* (2013.01); *C08G 77/04* (2013.01); *C08G 2170/40* (2013.01); *C09J 2205/114* (2013.01); *C09J 2205/302* (2013.01); *C09J 2205/31* (2013.01); *C09J 2483/00* (2013.01); *C09J 2483/005* (2013.01); *Y02P 20/582* (2015.11)

(58) Field of Classification Search
None
See application file for complete search history.

(56) References Cited

U.S. PATENT DOCUMENTS

| | | | |
|---|---|---|---|
| 2,676,182 | A | 4/1954 | Daudt |
| 2,754,312 | A | 7/1956 | Elliott |
| 3,627,851 | A | 12/1971 | Brady |
| 3,772,247 | A | 11/1973 | Flannigan |
| 4,119,615 | A | 10/1978 | Schulze |
| 4,935,484 | A | 6/1990 | Wolfgruber |
| 5,082,706 | A | 1/1992 | Tangney |
| 5,110,890 | A | 5/1992 | Butler |
| 5,223,465 | A | 6/1993 | Ueki |
| 5,248,739 | A | 9/1993 | Schmidt |
| 5,302,685 | A | 4/1994 | Tsumura |
| RE34,605 | E | 5/1994 | Schrenk |
| 5,319,040 | A | 6/1994 | Wengrovius |
| 5,360,659 | A | 11/1994 | Arends |
| 5,512,650 | A | 4/1996 | Leir |
| 5,579,162 | A | 11/1996 | Bjornard |
| 5,882,774 | A | 3/1999 | Jonza |
| 6,049,419 | A | 4/2000 | Wheatley |
| 6,070,107 | A | 5/2000 | Lombardi |
| 6,790,403 | B1 | 9/2004 | Priedeman |
| 7,501,184 | B2 | 3/2009 | Leir |
| 7,883,652 | B2 | 2/2011 | Leir |
| 8,063,166 | B2 | 11/2011 | Sherman |

(Continued)

FOREIGN PATENT DOCUMENTS

| | | |
|---|---|---|
| JP | H02-36234 | 2/1990 |
| JP | 2007-307286 | 11/2007 |

(Continued)

OTHER PUBLICATIONS

Ballistreri, "Thermal Decomposition Processes in Polyhydrazides and Polyoxamides Investigated by Mass Spectrometry", Polymer, Jan. 1987, vol. 28, pp. 139-146.

Encyclopedia of Polymer Science and Engineering, vol. 15, John Wiley & Sons, New York, 1989, pp. 265-270.

Roger, "Photochemistry of Aliphatic Polyamides. 3. Mechanisms of Photooxidation of Polyamides 6, 11, and 12 at Short Wavelength", Macromolecules, 1985, vol. 18, pp. 1771-1775.

(Continued)

*Primary Examiner* — Robert S Loewe

(74) *Attorney, Agent, or Firm* — Jeffrey M. Olofson

(57) ABSTRACT

Methods of modifying polymeric compositions include exposing a polydiorganosiloxane polyoxamide copolymer composition to UV radiation at or below the B spectral range to effect de-polymerization of at least a portion of the polydiorganosiloxane polyoxamide copolymer. The polydiorganosiloxane polyoxamide copolymer composition may include additional components and the modified polydiorganosiloxane polyoxamide copolymer compositions can be included into articles.

22 Claims, No Drawings

(56) References Cited

U.S. PATENT DOCUMENTS

| | | |
|---|---|---|
| 8,067,493 B2 | 11/2011 | Zhu |
| 8,361,626 B2 | 1/2013 | Sherman |
| 8,586,668 B2 | 11/2013 | Leir |
| 8,623,988 B2 | 1/2014 | Sherman |
| 8,853,323 B2 | 10/2014 | Leir |
| 9,018,331 B2 | 4/2015 | Sherman |
| 9,206,290 B2 * | 12/2015 | Leir |
| 2009/0283144 A1 * | 11/2009 | Hebrink ................ G02B 1/105 136/259 |
| 2011/0134623 A1 | 6/2011 | Sherman |
| 2011/0176325 A1 | 7/2011 | Sherman |
| 2013/0011608 A1 * | 1/2013 | Wolk .................... C09J 133/08 428/141 |
| 2014/0083482 A1 * | 3/2014 | Hebrink ............... H01L 31/054 136/246 |
| 2014/0178681 A1 | 6/2014 | Wright |
| 2015/0175785 A1 * | 6/2015 | Lavallee ................. C08K 5/34 524/102 |

FOREIGN PATENT DOCUMENTS

| | | |
|---|---|---|
| WO | WO 2002-004548 | 1/2002 |
| WO | WO 2007-070269 | 6/2007 |
| WO | WO 2009/002668 | 12/2008 |
| WO | WO 2009-089137 | 7/2009 |
| WO | WO 2013-039737 | 3/2013 |

OTHER PUBLICATIONS

International Search Report for PCT International Application No. PCT/US2017/019014, dated Apr. 13, 2017, 4 pages.

* cited by examiner

MODIFICATION OF SILOXANE POLYOXAMIDE COPOLYMERS WITH ULTRAVIOLET LIGHT

FIELD OF THE DISCLOSURE

Methods of modifying polydiorganosiloxane polyoxamide copolymers with ultraviolet light as well as articles prepared using such modified copolymers are disclosed.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides and polydiorganosiloxane polyureas are exemplary block copolymers.

Polydiorganosiloxane polyamides have been prepared by condensation reactions of amino terminated silicones with short-chained dicarboxylic acids. Alternatively, these copolymers have been prepared by condensation reactions of carboxy terminated silicones with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than about 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Polydiorganosiloxane polyureas are another type of block copolymer. Although these block copolymers have many desirable characteristics, some of them tend to degrade when subjected to elevated temperatures such as 250° C. or higher.

SUMMARY

Disclosed herein are methods of modifying polydiorganosiloxane polyoxamide copolymers with ultraviolet light, modified polydiorganosiloxane polyoxamide copolymers, and articles prepared using such modified copolymers.

Methods of modifying polymeric compositions are disclosed that comprise providing a polymeric composition comprising a polydiorganosiloxane polyoxamide copolymer, and exposing the polymeric composition to UV radiation at or below the B spectral range to effect de-polymerization of at least a portion of the polydiorganosiloxane polyoxamide copolymer.

Also disclosed are modified polymer compositions comprising the reaction product of a polydiorganosiloxane polyoxamide copolymer, and UV radiation at or below the B spectral range.

Additionally, articles comprising modified polymer compositions are disclosed comprising the reaction product of a polydiorganosiloxane polyoxamide copolymer, and UV radiation at or below the B spectral range, wherein the polydiorganosiloxane polyoxamide copolymer is modified by de-polymerization. The articles may comprise only the modified polydiorganosiloxane polyoxamide copolymer, or the articles may comprise additional components, such as substrates, agents blended with the modified polydiorganosiloxane polyoxamide copolymer, and the like.

DETAILED DESCRIPTION

Polymeric materials have become prevalent in modern industry and have found widespread uses in a wide range of products and applications. One problem with polymers is that once formed it can be very difficult to modify the polymers. This can be a good and necessary feature in instances where environmental stability is desired or needed, but it in other instances, it can be a marked disadvantage. For example if a film, sheet, part, or other polymeric article is prepared and found to be in some way defective, often the article can only be discarded. Some types of materials, such as thermoplastic materials, can be heated again and re-formed, but other types of materials such as crosslinked materials and elastomeric materials generally cannot be heated and re-formed.

Besides reworking of defective polymeric materials, there are many other applications in which it would be desirable to be readily able to modify polymers after their formation. In the area of adhesives, for example, there are many applications where it would be desirable to "turn off" the adhesive properties of the adhesive to permit the disassembly of adhesive articles. Among the many examples are labels and graphic articles, where one wishes the article to adhere strongly so as to not fall off or be tampered with, but when one wishes to remove them it would be desirable to be able to deactivate the adhesive so that the label or graphic article can be easily removed.

One class of polymeric materials that has found widespread use is siloxane polymers. Another term for siloxane polymers is silicones, and the terms will be used interchangeably in the present disclosure.

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides and polydiorganosiloxane polyureas are exemplary block copolymers.

Recently a new class of siloxane polymers has been developed, polydiorganosiloxane polyoxamides. These materials retain many of the desirable features of siloxane polymers with the added benefit that the oxamide linkages are very thermally stable. This enhanced thermal stability permits, for example, the polydiorganosiloxane polyoxamide copolymers to be thermally processed at higher temperatures without degrading, thus allowing these polymers to be extruded at higher temperatures than previous classes of siloxane polymers.

While the polydiorganosiloxane polyoxamide polymers have high thermal and environmental stability, it has been discovered that the oxamide linkages absorb ultraviolet radiation at wavelengths at or below the B spectral range. Upon absorption of the UV radiation, the oxamide linkage breaks, causing de-polymerization of the polydiorganosiloxane polyoxamide polymer. This permits a method of modifying polydiorganosiloxane polyoxamide polymers. The modification can be done selectively, i.e. by modifying only a portion of the polymer, or throughout the bulk of the polydiorganosiloxane polyoxamide polymer. Additionally, since many materials do not absorb ultraviolet radiation at wavelengths at or below the B spectral range, composite articles containing polydiorganosiloxane polyoxamide polymers can be modified with only the polydiorganosiloxane polyoxamide polymer being modified. Methods of modifying polydiorganosiloxane polyoxamide polymers, modified polymeric compositions, and articles containing modified polymeric compositions are disclosed.

The terms "a", "an", and "the" are used interchangeably with "at least one" to mean one or more of the elements being described.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent or higher valent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent or higher valent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent or higher valent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aryloxy" refers to a monovalent group of formula —OAr where Ar is an aryl group.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent or higher valent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term "oxalyl" refers to a divalent group of formula —(CO)—(CO)— where each (CO) denotes a carbonyl group.

The terms "oxalylamino" and "aminoxalyl" are used interchangeably to refer to a divalent group of formula —(CO)—(CO)—NH— where each (CO) denotes a carbonyl.

The term "aminoxalylamino" refers to a divalent group of formula —NH—(CO)—(CO)—$NR^d$— where each (CO) denotes a carbonyl group and $R^d$ is hydrogen, alkyl, or part of a heterocyclic group along with the nitrogen to which they are both attached. In most embodiments, $R^d$ is hydrogen or alkyl. In many embodiments, $R^d$ is hydrogen.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

As mentioned above, the terms "siloxane" and "silicone" are used interchangeably and refer to polymers or polymer precursors which contain siloxane units. Siloxane units refer to dialkyl or diaryl siloxane (—$SiR_2O$—) repeating units.

The term "polydiorganosiloxane" refers to a divalent segment of formula:

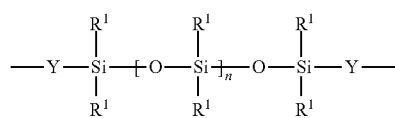

where each R' is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

The terms "room temperature" and "ambient temperature" are used interchangeably to mean temperatures in the range of 20° C. to 25° C.

The terms "Tg" and "glass transition temperature" are used interchangeably. If measured, Tg values are determined by Differential Scanning Calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is well understood by one of skill in the art The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature (Tg) or melting point (Tm) above room temperature. When the temperature is elevated above the Tg or Tm, the storage modulus usually decreases and the adhesive become tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Disclosed herein are methods of modifying polymeric compositions. These methods comprise providing a polymeric composition comprising a polydiorganosiloxane polyoxamide copolymer, and exposing the polymeric layer under ambient conditions to UV radiation at or below the B spectral range to effect de-polymerization of at least a portion of the polydiorganosiloxane polyoxamide copolymer.

The polydiorganosiloxane polyoxamide polymeric composition may be in the form of a layer, or it may be in the form of a three dimensional structure. The polydiorganosiloxane polyoxamide polymeric composition may be the sole polymeric composition or the polydiorganosiloxane polyoxamide polymeric composition may be part of a composite composition. For example, the polydiorganosiloxane polyoxamide copolymer may be part of an article that may include a variety of substrates, surfaces, and can include polymeric and non-polymeric materials.

In some embodiments, the polydiorganosiloxane polyoxamide copolymers are polydiorganosiloxane polyoxamide block copolymers, which are of the $(AB)_n$ type, are the condensation reaction product of (a) a diamine having primary or secondary amino groups with (b) a precursor having at least one polydiorganosiloxane segment and at least two oxalylamino groups. The copolymers have many of the desirable features of polysiloxanes such as low glass transition temperatures, thermal and oxidative stability, resistance to ultraviolet radiation above the B spectral range, low surface energy and hydrophobicity, and high permeability to many gases. Additionally, the copolymers can have improved mechanical strength and elastomeric properties compared to polysiloxanes. At least some of the copolymers are optically clear, have a low refractive index, or both.

In some embodiments, the polydiorganosiloxane polyoxamide block copolymers are linear copolymers that contain at least two repeat units of Formula I below:

Formula I

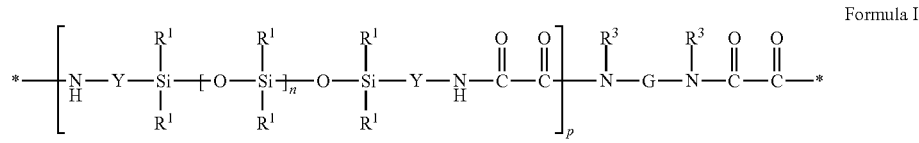

In this formula, each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and the subscript p is an integer of 1 to 10. Group G in this instance is a divalent group that is the residue unit that is equal to a diamine of formula $R^3HN$-G-$NHR^3$ minus the —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., if $R^3HN$-G-$NHR^3$ is piperazine or the like). Each asterisk (*) indicates a site of attachment of the repeat unit to another group in the copolymer such as, for example, another repeat unit of Formula I.

Suitable alkyl groups for $R^1$ in Formula I typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some repeat units of Formula I, at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula I is a residual unit that is equal to a diamine compound of formula $R^3HN\text{-}G\text{-}NHR^3$ minus the two amino groups (i.e., $-NHR^3$ groups). The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN\text{-}G\text{-}NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula $H_2N\text{-}G\text{-}NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines which are described below, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

In some particular embodiments, G is a polydiorganosiloxane, prepared from polydiorganosiloxane diamines of the formula:

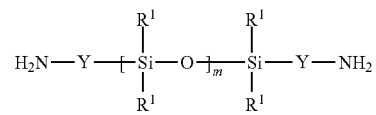

where the groups $R^1$ and Y are the same as described above, and the subscript m is an integer greater than 1, where G is the diamine minus the two $-NH_2$ groups. Exemplary polydiorganosiloxanes include, but are not limited to, polydimethylsiloxanes with alkylene Y groups.

The polydiorganosiloxane polyoxamide tends to be free of groups having a formula $-R^a-(CO)-NH-$ where $R^a$ is an alkylene. All of the carbonylamino groups along the backbone of the copolymeric material are part of an oxalylamino group (i.e., the $-(CO)-(CO)-NH-$ group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is a linear, block copolymer and can be an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to about 350° C. Additionally, the copolymers can often be heated at a temperature such as 250° C. for 1 hour in air without apparent degradation as determined by no detectable loss of mechanical strength upon cooling.

The copolymeric material of Formula I can be optically clear. As used herein, the term "optically clear" refers to a material that is clear to the human eye. An optically clear copolymeric material often has a luminous transmission of at least about 90 percent, a haze of less than about 2 percent, and opacity of less than about 1 percent in the 400 to 700 nm wavelength range. Both the luminous transmission and the haze can be determined using, for example, the method of ASTM-D 1003-95.

Additionally, the copolymeric material of Formula I can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of about 1.41 to about 1.50.

The preparation of such copolymers is described in, for example, U.S. Pat. Nos. 7,501,184, 7,883,652, 8,586,668, 8,853,323, and 9,206,290.

In other embodiments of this disclosure the polydiorganosiloxane polyoxamide block copolymers are non-linear copolymers including at least one repeat unit of Formula II:

an integer of 1 to 10. Each asterisk (*) indicates a site of attachment of the repeat unit to another group in the copolymer.

Suitable alkyl groups for $R^1$ in Formula II typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some repeat units of Formula II, all $R^1$ groups can be one of alkyl, haloalkyl, aralkyl, alkenyl, aryl, or aryl substituted with an alkyl, alkoxy, or halo (e.g., all $R^1$ Groups are an alkyl such as methyl or an aryl such as phenyl). In some

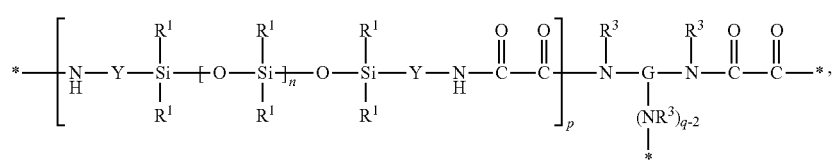

Formula II and at least one repeat unit of Formula III:

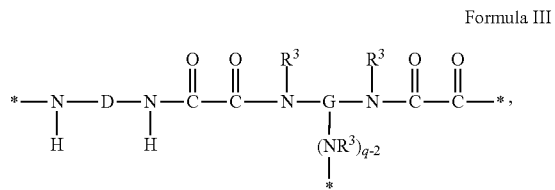

Formula III

In these formulas, each $R^1$ is independently an alkyl, haloalkyl, aralkyl, alkenyl, aryl, or aryl substituted with an alkyl, alkoxy, or halo. G is a q-valent residue unit equal to the formula $G(NHR^3)_q$ minus the q-$NHR^3$ groups, and q is an integer of 2 or greater. In certain embodiments q can, for example, be equal to 2, 3, or 4. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each Y is independently an alkylene, aralkylene, or a combination thereof. D is an organic soft segment residue. Subscript n is independently an integer of 0 to 1500 and the subscript p is compounds of Formula II, the $R^1$ groups are mixtures of two or more selected from the group consisting of alkyl, haloalkyl, aralkyl, alkenyl, aryl, and aryl substituted with an alkyl, alkoxy, or halo in any ratio. Thus, for example, in certain compounds of Formula II, 0%, 1%, 2, %, 5%, 10%, 20%, 30%, 40%, 50%, 60%, 70%, 80%, 90%, 95%, 98%, 99%, or 100% of the $R^1$ groups can be methyl; and 100%, 99%, 98%, 95%, 90%, 80%, 70%, 60%, 50%, 40%, 30%, 20%, 10%, 5%, 2%, 1%, or 0% of the $R^1$ groups can be phenyl.

In some repeat units of Formula II at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula II is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula II is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula II and/or Formula III is a residual unit that is equal to a diamine or polyamine compound of formula $G(NHR^3)_q$ minus the q amino groups (i.e., $-NHR^3$ groups), where q is an integer of 2 or greater. The diamine and/or polyamine can have primary and/or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine). In most embodiments, $R^3$ is hydrogen or an alkyl. In many embodiments, all of the amino groups of the diamine and/or polyamine are primary amino groups (i.e., all the $R^3$ groups are hydrogen) and the diamine and/or polyamine are of the formula $G(NH_2)_q$ (e.g., a diamine of the formula $H_2N-G-NH_2$ when q=2).

In certain embodiments, Group G in Formula II and/or Formula III is a mixture of residual units that are equal to (i) a diamine compound of the formula $R^3HN-G-NHR^3$ minus the two amino groups (i.e., $-NHR^3$ groups) and (ii) a polyamine compound of the formula $G(NHR^3)_q$ minus the q amino groups (i.e., $-NHR^3$ groups), where q is an integer greater than 2. In such embodiments, the polyamine compound of formula $G(NHR^3)_q$ can be, but is not limited to, triamine compounds (i.e., q=3), tetraamine compounds (i.e., q=4), and combinations thereof. In such embodiments, the number of equivalents of polyamine (ii) per equivalent of diamine (i) is generally at least 0.001, more generally at least 0.005, and most generally at least 0.01. In such embodiments, the number of equivalents of polyamine (ii) per equivalent of diamine (i) is generally at most 3, more typically at most 2, and most typically at most 1.

When G includes residual units that are equal to (i) a diamine compound of formula $R^3HN-G-NHR^3$ minus the two amino groups (i.e., $-NHR^3$ groups), G can be an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of the formula:

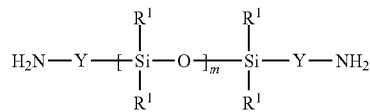

where the groups $R^1$ and Y are the same as described above, and the subscript m is an integer greater than 1, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each D is Formula III represents an organic soft segment. Organic soft segments typically include one or more polyether residues such as, for example, polyoxyethylene residues, polyoxypropylene residues, poly(oxyethylene-co-oxypropylene) residues, and combinations thereof. The organic soft segment generally has a number average molecular weight of at least 450 g/mol, more generally at least 700 g/mol, and most generally at least 2000 g/mol. The organic soft segment generally has a number average molecular weight of at most 8000 g/mol, more generally at most 6000 g/mol, and most generally at most 4000 g/mol. A wide variety of organic soft segments can be used including, for example, those described in U.S. Pat. No. 4,119,615 (Schulze).

In some specific embodiments, the polydiorganosiloxane polyamide having amide end-capped (e.g., oxalated) organic soft segment is a polydiorganosiloxane polyoxamide. The polydiorganosiloxane polyamide tends to be free of groups having a formula $-R^a-(CO)-NH-$ where $R^1$ is an alkylene. All of the carbonylamino groups along the backbone of the copolymeric material are part of an oxalylamino group (i.e., the $-(CO)-(CO)-NH-$ group). That is, any carbonyl group along the backbone of the copolymeric material is bonded to another carbonyl group and is part of an oxalyl group. More specifically, the polydiorganosiloxane polyoxamide has a plurality of aminoxalylamino groups.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to 350° C. Additionally, the copolymers can often be heated at a temperature such as 250° C. for 1 hour in air without apparent degradation as determined by no detectable loss of mechanical strength upon cooling.

The copolymeric material having repeat units of Formula II and Formula III can be optically clear. As used herein, the term "optically clear" refers to a material that is clear to the human eye. An optically clear copolymeric material often has a luminous transmission of at least 90 percent, a haze of less than 2 percent, and opacity of less than 1 percent in the 400 to 700 nm wavelength range. Both the luminous transmission and the haze can be determined using, for example, the method of ASTM-D 1003-95.

Additionally, the copolymeric material having repeat units of Formula II and Formula III can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. For some embodiments (e.g., embodiments in which the copolymer includes a polydimethylsiloxane segment), the copolymeric material can have a refractive index in the range of 1.41 to 1.50. For some other embodiments (e.g., embodiments in which the copolymer includes a polyphenylsiloxane or a polydiphenylsiloxane segment), the copolymeric material can have a refractive index in the range of from 1.46 to 1.55.

The preparation of such polymers is described, for example in U.S. Pat. Nos. 8,063,166, 8,361,626, 8,623,988, and 9,018,331.

To modify the polydiorganosiloxane polyoxamide copolymers, the copolymers are exposed to UV radiation at or below the B spectral range to effect de-polymerization of at least a portion of the polydiorganosiloxane polyoxamide copolymer.

Ultraviolet or UV radiation is a portion of the electromagnetic spectrum located in the wavelength region between visible light and X-ray radiation with wavelengths of from 400 nanometers (nm) to 10 nm. UV radiation is typically subdivided into regions that are described as UVA (315-400 nm), UVB (280-315 nm) and UVC (100-280). In nature, the long wavelength UVA light is not absorbed by the ozone layer, the medium wavelength UVB is mostly absorbed by the ozone layer, and the short wavelength UVC is completely absorbed by the ozone layer. Thus UVC and much of UVB radiation is not present in natural light.

The polydiorganosiloxane polyoxamide copolymers while transmissive of visible light and UVA radiation, absorb light in the range of 315 nm and below (the UVB and UVC wavelength range). The oxamide linkages in the polydiorganosiloxane polyoxamide copolymers is responsible for this absorbance, as similar siloxane polyurea copolymers do not demonstrate this absorbance behavior. A consequence of this absorbance is that when the polydiorganosiloxane polyoxamide copolymers are exposed to UV radiation at or below the B spectral range, the copolymers absorb the radiation and this absorption causes de-polymerization of the polydiorganosiloxane polyoxamide copolymers. At least one product of this de-polymerization is a siloxane fluid.

The method that exposure of the polydiorganosiloxane polyoxamide copolymers are exposed to UV light depends greatly on the form the polydiorganosiloxane polyoxamide copolymers take and the nature of any additional components present with the polydiorganosiloxane polyoxamide copolymers. In embodiments in which there is only one substrate present or in which the polydiorganosiloxane polyoxamide copolymers comprise a free standing article, or in which at least one of the substrates is transparent to UV light in the desired wavelength range, the polydiorganosiloxane polyoxamide copolymers may be exposed directly. In some embodiments, however, the polydiorganosiloxane polyoxamide copolymers may be located between two substrates that are opaque to UV light. In these embodiments, it may be sufficient to irradiate the exposed edge with UV light to effect the desired depolymerization. In other embodiments, however, the UV light may be transported from the edge into the polydiorganosiloxane polyoxamide copolymer layer by total internal reflection. This process is well understood with light guides, including viscoelastic light guides as described in US Patent Publication Nos. 2011/0134623 and 2011/0176325 (Sherman et al.).

Siloxane polymers, and polydiorganosiloxane polyoxamide copolymers in particular, are generally considered and reported to be stable to UV radiation (see for example U.S. Pat. Nos. 7,501,184, 7,883,652, 8,586,668, 8,853,323, and 9,206,290; and U.S. Pat. Nos. 8,063,166, 8,361,626, 8,623,988, and 9,018,331), and thus are environmentally stable. This interpretation is not incorrect, as these copolymers are stable to the UV radiation present in nature. However, what was unexpected is that the UV radiation at or below the B spectral region is absorbed by these copolymers, and that this absorption causes de-polymerization of the polydiorganosiloxane polyoxamide copolymers. This is extremely fortuitous, as the copolymers have environmental stability in natural light, but can be modified by de-polymerization in light that, while not present in nature, is readily available for use, such as with germicidal lamps.

The general methodology of this disclosure has wide applicability for modifying polydiorganosiloxane polyoxamide copolymer compositions. As mentioned above, the polydiorganosiloxane polyoxamide copolymer compositions can be in a wide range of configurations, such as in layers or in a wide range of three dimensional configurations. Additionally, the polydiorganosiloxane polyoxamide copolymers can be the sole polymeric composition present or the additional polymeric components can be present either as separate and discrete layers or the additional polymeric components can be in intimate contact with the polydiorganosiloxane polyoxamide copolymer in the form of, for example, a blend or similar mixture. Typically, if other polymeric components are present, these additional polymeric components do not absorb UV radiation at or below the B spectral range.

In some embodiments, the polydiorganosiloxane polyoxamide copolymer to be modified comprises a layer of polydiorganosiloxane polyoxamide copolymer. This layer may be a free standing layer or it may be present disposed on a substrate. Additionally, the layer may be continuous or discontinuous, and more than one layer may be present. If more than one layer is present, the multi-layer construction may comprise additional layers of polydiorganosiloxane polyoxamide copolymer, it may comprise additional layers of other polymeric or non-polymeric materials, or both.

In some embodiments, the layer comprises an adhesive layer. The adhesive layer may be a pressure sensitive adhesive layer, a heat activated layer, or a pre-adhesive layer. By pre-adhesive layer, it is meant that the layer is not itself an adhesive layer but upon modification becomes an adhesive layer. Typically a pre-adhesive layer comprises monomers which upon polymerization forms an adhesive layer, but in this context a pre-adhesive layer comprises, for example, a crosslinked layer which upon de-polymerization becomes an adhesive layer.

Either pressure sensitive adhesives or heat activated adhesives can be formulated by combining the polydiorganosiloxane polyoxamides with a tackifier such as a silicone tackifying resin. As used herein, the term "pressure sensitive adhesive" refers to an adhesive that possesses the following properties: (1) aggressive and permanent tack; (2) adherence to a substrate with no more than finger pressure; (3) sufficient ability to hold onto an adherend; and (4) sufficient cohesive strength to be removed cleanly from the adherend. As used herein, the term "heat activated adhesive" refers to an adhesive composition that is essentially non-tacky at room temperature but that becomes tacky above room temperature above an activation temperature such as above 30° C. Heat activated adhesives typically have the properties of a pressure sensitive adhesive above the activation temperature.

Tackifying resins such as silicone tackifying resins are added to the polydiorganosiloxane polyoxamide copolymer to provide or enhance the adhesive properties of the copolymer. These tackifying resins were formerly referred to as "silicate" tackifying resins. The silicone tackifying resin can influence the physical properties of the resulting adhesive composition. For example, as silicone tackifying resin content is increased, the glassy to rubbery transition of the adhesive composition occurs at increasingly higher temperatures. In some exemplary adhesive compositions, a plurality of silicone tackifying resins can be used to achieve desired performance.

Suitable silicone tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicone resins include MQ silicone tackifying resins, MQD silicone tackifying resins, and MQT silicone tackifying resins. These silicone tackifying resins usually have a number average molecular weight in the range of 100 to 50,000 or in the range of 500 to 15,000 and generally have methyl R' groups.

MQ silicone tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the silicone tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M silicone tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ silicone tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicone tackifying resin. This may be accomplished, for example, by reacting hexamethyldisilazane with the silicone tackifying resin. Such a reaction may be catalyzed, for example, with trifluoroacetic acid. Alternatively, trimethylchlorosilane or trimethylsilylacetamide may be reacted with the silicone tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl R' groups of the $R'_2SiO_{2/2}$ units ("D" units) can be replaced with vinyl ($CH_2=CH-$) groups ("$D^{Vi}$" units).

MQT silicone tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler) and Japanese Kokai HE 2-36234.

Suitable silicone tackifying resins are commercially available from sources such as Dow Corning, Midland, Mich., Momentive Performance Materials, Waterford, N.Y. and Bluestar Silicones, Rock Hill, S.C. Examples of particularly useful MQ silicone tackifying resins include those available under the trade designations SR-545 and SR-1000, both of which are commercially available from Momentive Performance Materials, Waterford, N.Y. Such resins are generally supplied in organic solvent and may be employed in the formulations of the adhesives of the present disclosure as received. Blends of two or more silicone resins can be included in the adhesive compositions.

The adhesive compositions typically contain 20 to 80 weight percent polydiorganosiloxane polyoxamide and 20 to 80 weight percent silicone tackifying resin based on the combined weight of polydiorganosiloxane polyoxamide and silicone tackifying resin. For example, the adhesive compositions can contain 30 to 70 weight percent polydiorganosiloxane polyoxamide and 30 to 70 weight percent silicone tackifying resin, 35 to 65 weight percent polydiorganosiloxane polyoxamide and 35 to 65 weight percent silicone tackifying resin, 40 to 60 weight percent polydiorganosiloxane polyoxamide and 40 to 60 weight percent silicone tackifying resin, or 45 to 55 weight percent polydiorganosiloxane polyoxamide and 45 to 55 weight percent silicone tackifying resin.

In embodiments where the polymeric layer comprising a polydiorganosiloxane polyoxamide copolymer comprises a pressure sensitive adhesive, the modification by exposure to UV radiation at or below the B spectral region causes the pressure sensitive adhesive to lose its pressure sensitive adhesive properties. While not wishing to be bound by theory, the modification of the polydiorganosiloxane polyoxamide copolymer pressure sensitive adhesive resulting in the loss of pressure sensitive adhesive properties may be the result of the loss of tackiness from portions of the polydiorganosiloxane polyoxamide copolymer being converted to a siloxane fluid, or it may be from the loss of cohesive strength caused by the de-polymerization, or it may be a combination of these factors or of other factors.

The modification of the polydiorganosiloxane polyoxamide copolymer pressure sensitive adhesive is carried out on at least a portion of the pressure sensitive adhesive layer. In some embodiments, the entire layer or at least a majority of the layer is modified by exposure to UV radiation at or below the B spectral range. In other embodiments, the modification is done in selective or discrete areas. The exposure of only selective or discrete areas can be carried out by using a discrete UV light source such as a UV laser, or it can be carried out by shielding the regions not to be modified by masking or other shielding mechanisms.

One particularly suitable application where the modification of a pressure sensitive adhesive layer to render at least a portion of the pressure sensitive adhesive layer non-pressure sensitive, is in the disassembly of laminates. Laminates are articles comprising multiple layers of material. The simplest pressure sensitive adhesive laminate is an article of type: substrate-1/pressure sensitive adhesive/substrate-2. In this type of laminate, the two substrates can be the same or different, they can be films or rigid substrates, they can be polymeric materials or non-polymeric materials such as glass, metals, wood, ceramic, and the like. If, for example, both substrates are rigid substrates such as two glass plates, once the laminate is formed it is almost impossible to separate the substrates because of the adhesive strength of the polydiorganosiloxane polyoxamide copolymer pressure sensitive adhesive. However, using the methodology of this disclosure, the polydiorganosiloxane polyoxamide copolymer pressure sensitive adhesive can be modified by exposure to UV radiation at or below the B spectral region such that at least portions of the polydiorganosiloxane polyoxamide copolymer pressure sensitive adhesive lose their pressure sensitive adhesive properties and thus permitting the two rigid glass substrates to be separated. Such a process can be particularly advantageous in manufacturing operations in which such laminate constructions are formed. In these operations, if a defect is present in the lamination, it is extremely difficult to unmake the lamination to eliminate the defect. A wide range of defects can occur during lamination, such as misalignment of the substrates, defects in a substrate, or contamination of the bond line by dust or other detritus. With the present methodology, if a defect is detected, the lamination can be unmade by modifying the polydiorganosiloxane polyoxamide copolymer pressure sensitive adhesive, permitting the defect in the laminate to be remedied.

Another application for the methodology of this disclosure in adhesive laminates is for recycling at the end of service life. Once the laminate has fulfilled its purpose, as mentioned above, it is almost impossible to separate the substrates because of the adhesive strength of the polydiorganosiloxane polyoxamide copolymer pressure sensitive adhesive. However, using the methodology of this disclosure, the polydiorganosiloxane polyoxamide copolymer pressure sensitive adhesive can be modified by exposure to UV radiation at or below the B spectral region such that at least portions of the polydiorganosiloxane polyoxamide copolymer pressure sensitive adhesive lose their pressure sensitive adhesive properties and thus permitting the two substrates to be separated. The two substrates need not be rigid substrates, for example one could be a film and one could be a rigid substrate. In this example, the film substrate could be removed and discarded and the rigid substrate could be reused. Examples of this are for example computer, tablet, or cell phone screens where a protective film could be removed without damaging the underlying substrate surface, or a window, where a window film could be easily removed without damaging the window surface.

As mentioned above, the polydiorganosiloxane polyoxamide layer can be part of a multi-layer article. In some embodiments, the multi-layer article can contain multiple layers of pressure sensitive adhesive. In these embodiments, at least one of the layers of pressure sensitive adhesive comprises a polydiorganosiloxane polyoxamide copolymer pressure sensitive adhesive. Having at least one layer of a multi-layer construction be modifiable can provide a wide flexibility in the handling and use of the multi-layer construction. For example, a thin layer of polydiorganosiloxane polyoxamide copolymer pressure sensitive adhesive can be sandwiched between two other layers of pressure sensitive adhesive such that upon modification the polydiorganosiloxane polyoxamide copolymer pressure sensitive adhesive forms a weak point boundary layer between the two other pressure sensitive adhesives and permitting their separation. Or a thin layer of the polydiorganosiloxane polyoxamide copolymer pressure sensitive adhesive could be used as a skin layer on the exterior surface of a pressure sensitive adhesive layer such that the polydiorganosiloxane polyoxamide copolymer pressure sensitive adhesive is in contact with a substrate. Upon modification of the polydiorganosiloxane polyoxamide copolymer pressure sensitive adhesive, a weak boundary layer is formed between the pressure sensitive adhesive layer and the substrate, permitting their separation. A wide range of similar multi-layer constructions can be envisaged utilizing the methodology of this disclosure.

The polydiorganosiloxane polyoxamide copolymer pressure sensitive adhesive need not form a continuous layer or need not be the sole component of a layer. Discontinuous layers of polydiorganosiloxane polyoxamide copolymer pressure sensitive adhesive can be used. Additionally, blends of the polydiorganosiloxane polyoxamide copolymer pressure sensitive adhesive with additional polymeric and non-polymeric materials, including other pressure sensitive adhesive materials, can give an adhesive layer that upon modification of the polydiorganosiloxane polyoxamide copolymer pressure sensitive adhesive can sufficiently modify the entire layer to weaken the adhesion enough to permit separation.

As mentioned above, the modification of the polydiorganosiloxane polyoxamide copolymer can not only transform an adhesive into a non-adhesive, but also can transform a non-adhesive into an adhesive. An example of such a process, taking a pre-adhesive polymer and modifying it by exposure to UV radiation at or below the B spectral region, to form an adhesive, is the de-polymerization of a cross-linked polymeric composition. In this scenario, a crosslinked polydiorganosiloxane polyoxamide copolymer, which is an elastomeric polymer, can be changed into a viscoelastic pressure sensitive adhesive by de-polymerization. Polydiorganosiloxane polyoxamide copolymers can be crosslinked either through the use of crosslinking agents or by exposure to electron beam radiation. In this way, for example, a polydiorganosiloxane polyoxamide copolymer pressure sensitive adhesive layer can be crosslinked by electron beam radiation to form a non-tacky layer of crosslinked elastomer. A non-tacky layer of crosslinked elastomer is much easier to handle, transport, and convert, and does not require protection by, for example, a release liner. Once the non-tacky layer of crosslinked elastomer has been processed, exposure to UV radiation at or below the B spectral region can reform the adhesive layer.

Examples of other articles which contain layers of the polydiorganosiloxane polyoxamide copolymer include release articles. Examples of release articles include release liners and articles with low adhesion backsizes. Low adhesion backsizes are release coatings used in tape articles, in which the low adhesion backsize coating is placed on the back of the tape backing to permit the tape to be rolled up such that the adhesive layer contacts the low adhesion backsize coating. These release articles include a backing and a release coating of polydiorganosiloxane polyoxamide copolymer. As with the adhesive layers described above, the release coatings of polydiorganosiloxane polyoxamide copolymer can similarly be modified by exposure to UV radiation at or below the B spectral region. Examples of modifications that can be effected with release layers include selective modification of portions of the release layer to provide differential release properties, or layer-wide modification to permit facile removal of the release layer.

A wide variety of other coatings prepared from polydiorganosiloxane polyoxamide copolymers can also be modified by exposure to UV radiation at or below the B spectral region. The coatings may comprise a variety of additives such as tackifying resins, plasticizing resins, fillers, microparticles, nanoparticles, colorants such as pigments or dyes, heat transfer particles, magnetic transfer particles, stabilizers, and the like, or combinations thereof. Examples of such coatings include protective coatings, optical property modification coatings and the like. Many of these coatings comprise additional components such as microparticles or nanoparticles to enhance the toughness or modify the optical properties. Examples of modifications that can be effected with these coatings include selective modification of portions of the coating, or layer-wide modification to permit facile removal of the coating. An example of a selective modification of a coating is the modification of a diffusive coating containing microparticles to make the diffusive coating discontinuous. A continuous diffusive coating could be selectively modified such that portions of the coating are rendered not diffusive by modifying portions of the coating by exposure to UV radiation at or below the B spectral region to de-polymerize those portions, and then removing the de-polymerized portions by wiping or other removal means.

In some embodiments, the polydiorganosiloxane polyoxamide copolymer composition is not in the form of a layer but is instead in the form of a three dimensional article. These three dimensional articles can have a wide range of shapes, sizes and forms, and can contain not only the polydiorganosiloxane polyoxamide copolymer, but also can contain other polymeric and non-polymeric materials. An example of a three dimensional article that could be formed by modification of polydiorganosiloxane polyoxamide copolymer composition by exposure to UV radiation at or below the B spectral region, is a three dimensional foam article. A blend of the polydiorganosiloxane polyoxamide copolymer and one or more polymeric components that are not sensitive to UV radiation at or below the B spectral region can be prepared and formed into any desired shape. The article can then be exposed to UV radiation at or below the B spectral region to modify the polydiorganosiloxane polyoxamide copolymer composition by de-polymerization. The de-polymerized material could then be removed from the article by pouring, vacuum removal, wiping, etc, to form a foam article containing voids where the polydiorganosiloxane polyoxamide copolymer composition used to be.

Additionally, articles comprising the polydiorganosiloxane polyoxamide copolymer composition can be prepared by three dimensional printing processes, as described, for example in U.S. Pat. Nos. 6,790,403 and 6,070,107. This rapidly developing technology permits the formation of a wide range of three dimensional articles. The three dimensionally printed article can then be modified by UV radiation at or below the B spectral range to form a modified article. The polydiorganosiloxane polyoxamide copolymer composition may comprise only the polydiorganosiloxane polyoxamide copolymer or it may comprise the wide range of additional components described above.

Also disclosed are modified polymer compositions that are the reaction product of a polydiorganosiloxane polyoxamide copolymer composition and UV radiation at or below the B spectral range. One way of describing the modified polymer compositions is as the products formed when the methodology described above is applied to a polydiorganosiloxane polyoxamide copolymer. Suitable polydiorganosiloxane polyoxamide copolymers and suitable UV radiation are described in detail above. Also, as described above the polydiorganosiloxane polyoxamide copolymer compositions may include additional polymeric and non-polymeric materials, and may be in the form of layers or three dimensional articles. Also as described above, the entire polydiorganosiloxane polyoxamide copolymer composition may be modified, or the modification can be carried out selectively in discreet locations.

In some embodiments the reaction product comprises silanol functional groups (i.e. —SiOH groups) that were not present in the polydiorganosiloxane polyoxamide copolymer prior to exposure to UV radiation at or below the B spectral range. These silanol functional groups are detectable, for example by NMR (nuclear magnetic resonance) spectroscopy.

In some embodiments the formed reaction product comprises a siloxane fluid. As mentioned above, the siloxane fluid can often be removed from the composition by wiping, pouring, vacuum removal, and the like.

In some embodiments the polydiorganosiloxane polyoxamide copolymer is a crosslinked polymer, which as described above, does not have pressure sensitive adhesive properties. However, the reaction product, does have pressure sensitive adhesive properties, such as tackiness.

Also disclosed herein are articles that comprise a modified polydiorganosiloxane polyoxamide copolymer composition. The article may comprise just the modified polydiorganosiloxane polyoxamide copolymer composition or the polymer may include additional polymeric or non-polymeric components to form multi-component articles or composite articles. Multi-component articles are those in which the modified polydiorganosiloxane polyoxamide copolymer composition and the additional components form separate layers. An example of such an article is a substrate with a layer of modified polydiorganosiloxane polyoxamide copolymer composition disposed on it. Composite articles are those in which the modified polydiorganosiloxane polyoxamide copolymer and the additional components are mixed and not present in discreet layers.

In some embodiments of multi-component articles, the additional component can be a substrate with a first major surface and a second major surface, and a modified polymeric layer disposed on the first major surface of the substrate, wherein the modified polymeric layer comprises a polydiorganosiloxane polyoxamide copolymer that has been at least been at least partially exposed to UV radiation at or below the B spectral range.

A wide range of substrates are suitable for use in these articles. The substrate may be rigid, semi-rigid, or flexible.

Examples of rigid substrates include glass plates, relatively thick polymeric plates such as plates of polycarbonate (PC) or polymethylmethacrylate (PMMA), ceramics, metal plates, or the external surface of device. Examples of semi-rigid substrates include relatively thick polymeric films (either monolithic films or multilayer films), thick metal foils, and the like. Examples of flexible substrates include tape backings, films (including both optical films and non-optical films), and release liners.

A particularly suitable class of substrates are optical films. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical films include, but are not limited to, visible mirror films, color mirror films, solar reflective films, infrared reflective films, ultraviolet reflective films, brightness enhancement films, reflective polarizer films such as dual brightness enhancement films, absorptive polarizer films, optically clear films, tinted films, and antireflective films.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.); and U.S. Pat. No. 5,360,659 (Arends et al.).

In other embodiments, the substrate is a tape backing. The tape backing may be opaque or translucent or can come in a variety of different colors and may be porous or nonporous. The tape backing may include a wide variety of forms including paper sheets, natural or synthetic fiber webs, and films comprising nylon, polyesters, polyacetates, polyacrylics, ethylene-propylene-diene rubbers, natural rubber, polyesters, polyisobutylenes, polyolefins (e.g., polypropylene polyethylene, ethylene propylene copolymers, and ethylene butylene copolymers), polyurethanes (including polyurethane foams), vinyls including polyvinylchloride and ethylene-vinyl acetate, polyamides, polystyrenes, fiberglass, ceramic fibers, and/or combinations thereof.

In some embodiments, the articles further comprise a second substrate with a first major surface and a second major surface, wherein the second major surface of the second substrate is in contact with modified polymeric layer. Suitable second substrates include the substrates described above. The second substrate may be the same as the first or it may be different. Particularly suitable articles are those that include a rigid first substrate and a rigid second substrate, those that include a rigid first substrate and flexible second substrate, and those that include two flexible substrates.

Among the methodologies described above are those in which articles of the type: substrate-1/pressure sensitive adhesive/substrate-2 where the polydiorganosiloxane polyoxamide copolymer pressure sensitive adhesive is modified to permit the separation of at least one of the substrates. Also disclosed are such articles of this type in which substrate-1 and substrate-2 are not removable from the article until the polydiorganosiloxane polyoxamide copolymer pressure sensitive adhesive is modified by exposure to UV radiation at or below the B spectral range.

In some embodiments, at least one of the first substrate or the second substrate is transmissive to UV radiation at or below the B spectral range. In this way the polydiorganosiloxane polyoxamide copolymer can be modified directly through one of the substrates.

In other embodiments, neither the first substrate nor the second substrate is transmissive to UV radiation at or below the B spectral range, and wherein the modified polymer layer further comprises a means for transporting UV radiation at or below the B spectral range. In these embodiments, it may be sufficient to irradiate the exposed edge with UV light to effect the desired depolymerization. In other embodiments, however, the UV light may be transported from the edge into the polydiorganosiloxane polyoxamide copolymer layer by total internal reflection. This process is well understood with light guides, including viscoelastic light guides as described in US Patent Publication Nos. 2011/0134623 and 2011/0176325 (Sherman et al.).

Also disclosed are composite articles comprising a modified polydiorganosiloxane polyoxamide copolymer and at least one additional polymeric material, where the modified polydiorganosiloxane polyoxamide copolymer is at least partially de-polymerized by exposure to UV radiation at or below the B spectral range. In these composite articles the modified polydiorganosiloxane polyoxamide copolymer and at least one additional polymeric material are intimately mixed to form a substantially homogeneous mixture, in other composite articles there are discreet domains of modified polydiorganosiloxane polyoxamide copolymer and at least one additional polymeric material.

In some embodiments, the modified polydiorganosiloxane polyoxamide copolymer is at least partially removable from the composite article. The modified polydiorganosiloxane polyoxamide copolymer can be removed from the composite article by pouring, vacuum removal, wiping, etc.

The composite articles of this disclosure may be disposed on a substrate as described above, or they may be free standing three dimensional articles. As described above, the free standing three dimensional articles can be produced in a wide variety of ways including by three dimensional printing.

A wide variety of polymeric materials may be used as the additional polymeric material. The additional polymeric materials may be thermoplastic, thermoset, elastomeric, or viscoelastomeric depending upon the desired properties and use for the composite article.

This disclosure includes the following embodiments:

Among the embodiments are methods for modifying polymeric compositions.

Embodiment 1 includes a method of modifying a polymeric composition comprising: providing a polymeric composition comprising a polydiorganosiloxane polyoxamide copolymer; and exposing the polymeric composition to UV radiation at or below the B spectral range to effect de-polymerization of at least a portion of the polydiorganosiloxane polyoxamide copolymer.

Embodiment 2 is the method of embodiment 1, wherein the polymeric composition comprises at least one polymeric layer.

Embodiment 3 is the method of embodiment 2, further comprising a substrate wherein the polymeric layer is disposed on a substrate.

Embodiment 4 is the method of embodiment 3, wherein the substrate comprises a rigid substrate, a semi-rigid substrate, or a flexible substrate.

Embodiment 5 is the method of embodiment 3 or 4, wherein the substrate comprises a rigid substrate, selected from a glass plate, a polymeric plates of polycarbonate (PC), a polymeric plate of polymethylmethacrylate (PMMA), a ceramic substrate, a metal plate, or the external surface of device.

Embodiment 6 is the method of embodiment 3 or 4, wherein the substrate comprises a semi-rigid substrate selected from thick monolithic polymeric films, thick multilayer polymeric films, or thick metal foils.

Embodiment 7 is the method of embodiment 3 or 4, wherein the substrate comprises a flexible substrate selected from tape backings, optical films, non-optical films, and release liners.

Embodiment 8 is the method of embodiment 7, wherein the substrate comprises an optical film selected from visible mirror films, color mirror films, solar reflective films, infrared reflective films, ultraviolet reflective films, brightness enhancement films, reflective polarizer films, dual brightness enhancement films, absorptive polarizer films, optically clear films, tinted films, and antireflective films.

Embodiment 9 is the method of embodiment 7, wherein substrate comprises a tape backing wherein the tape backing comprises a paper sheet, natural or synthetic fiber webs, or films comprising nylon, polyesters, polyacetates, polyacrylics, ethylene-propylene-diene rubbers, natural rubber, polyesters, polyisobutylenes, polyolefins, polyurethanes, polyurethane foams, polyvinylchloride, ethylene-vinyl acetate, polyamides, polystyrenes, fiberglass, ceramic fibers, or combinations thereof.

Embodiment 10 is the method of any of embodiments 2-9, wherein the at least one polymeric layer comprises a pressure sensitive adhesive.

Embodiment 11 is the method of embodiment 10, wherein de-polymerization of at least a portion of the polydiorganosiloxane polyoxamide copolymer pressure sensitive adhesive layer causes the at least a portion of the polydiorganosiloxane polyoxamide copolymer to become non-pressure sensitive.

Embodiment 12 is the method of any of embodiments 2-9, wherein the polymeric layer comprises a release layer.

Embodiment 13 is the method of any of embodiments 2-9, wherein the polymeric layer comprises a polymeric coating layer.

Embodiment 14 is the method of embodiment 13, wherein the polymeric coating layer further comprises at least one additive selected from tackifying resins, plasticizing resins, fillers, microparticles, nanoparticles, pigments, dyes, heat transfer particles, magnetic transfer particles, stabilizers, or combinations thereof.

Embodiment 15 is the method of any of embodiments 2-9, wherein the polymeric layer comprising a polydiorganosiloxane polyoxamide copolymer comprises a non-adhesive crosslinked polymeric layer and de-polymerization of at least a portion of the polydiorganosiloxane polyoxamide copolymer causes the at least a portion of the polydiorganosiloxane polyoxamide copolymer to become an adhesive.

Embodiment 16 is the method of embodiment 15, wherein the adhesive comprises a pressure sensitive adhesive.

Embodiment 17 is the method of embodiment 15, wherein the adhesive comprises a heat activated adhesive.

Embodiment 18 is the method of any of embodiments 1-17, wherein exposing the polymeric layer to UV radiation at or below the B spectral range to effect de-polymerization of at least a portion of the polydiorganosiloxane polyoxamide copolymer comprises selective exposure of a discrete portion of the polymeric layer.

Embodiment 19 is the method of any of embodiments 1-18, wherein the polymeric composition comprises a composite composition comprising a polydiorganosiloxane polyoxamide copolymer and at least one other polymeric material.

Embodiment 20 is the method of any of embodiments 1-19, wherein the polymeric composition comprises a free standing three dimensional article.

Also disclosed are modified polymer compositions.

Embodiment 21 includes a modified polymer composition comprising: the reaction product of: a polydiorganosiloxane polyoxamide copolymer; and UV radiation at or below the B spectral range.

Embodiment 22 is the composition of embodiment 21, wherein the reaction product comprises silanol functional groups that were not present in the polydiorganosiloxane polyoxamide copolymer prior to exposure to UV radiation at or below the B spectral range.

Embodiment 23 is the composition of embodiment 21 or 22, wherein the reaction product comprises a siloxane fluid.

Embodiment 24 is the composition of embodiment 23, wherein the siloxane fluid is removable.

Embodiment 25 is the composition of any of embodiments 20-24, wherein the polydiorganosiloxane polyoxamide copolymer prior to exposure to UV radiation at or below the B spectral range comprises a crosslinked copolymer that is non-adhesive, and after exposure to UV radiation at or below the B spectral range comprises an adhesive.

Embodiment 26 is the composition of any of embodiments 20-25, wherein only a portion of the polydiorganosiloxane polyoxamide copolymer has been modified by exposure to UV radiation at or below the B spectral range.

Also disclosed are articles.

Embodiment 27 includes an article comprising: a modified polymer composition comprising: the reaction product of: a polydiorganosiloxane polyoxamide copolymer; and UV radiation at or below the B spectral range.

Embodiment 28 is the article of embodiment 27, wherein the article further comprises at least one additional component to form a multi-component article, a composite article, or a combination thereof.

Embodiment 29 is the article of embodiment 28, wherein the article comprises a multi-component article comprising: a first substrate with a first major surface and a second major surface; and a modified polymeric layer disposed on the first major surface of the first substrate, wherein the modified polymeric layer comprises the modified polymer composition.

Embodiment 30 is the article of embodiment 29, wherein the first substrate comprises a rigid substrate, a semi-rigid substrate, or a flexible substrate.

Embodiment 31 is the article of embodiment 29 or 30, wherein the first substrate comprises a rigid substrate, selected from a glass plate, a polymeric plates of polycarbonate (PC), a polymeric plate of polymethylmethacrylate (PMMA), a ceramic substrate, a metal plate, or the external surface of device.

Embodiment 32 is the article of embodiment 29 or 30, wherein the first substrate comprises a semi-rigid substrate selected from thick monolithic polymeric films, thick multilayer polymeric films, or thick metal foils.

Embodiment 33 is the article of embodiment 29 or 30, wherein the first substrate comprises a flexible substrate selected from tape backings, optical films, non-optical films, and release liners.

Embodiment 34 is the article of embodiment 33, wherein the first substrate comprises an optical film selected from visible mirror films, color mirror films, solar reflective films, infrared reflective films, ultraviolet reflective films, brightness enhancement films, reflective polarizer films, dual brightness enhancement films, absorptive polarizer films, optically clear films, tinted films, and antireflective films.

Embodiment 35 is the article of embodiment 33, wherein first substrate comprises a tape backing wherein the tape backing comprises a paper sheet, natural or synthetic fiber webs, or films comprising nylon, polyesters, polyacetates, polyacrylics, ethylene-propylene-diene rubbers, natural rubber, polyesters, polyisobutylenes, polyolefins, polyurethanes, polyurethane foams, polyvinylchloride, ethylene-vinyl acetate, polyamides, polystyrenes, fiberglass, ceramic fibers, or combinations thereof.

Embodiment 36 is the article of any of embodiments 29-35, further comprising a second substrate with a first major surface and a second major surface, wherein the second major surface of the second substrate is in contact with modified polymeric layer.

Embodiment 37 is the article of embodiment 36, wherein the first substrate and the second substrate are the same.

Embodiment 38 is the article of embodiment 36, wherein the first substrate and the second substrate are different.

Embodiment 39 is the article of any of embodiments 29-38, wherein the first substrate is not removable from the modified polymeric layer until after modification of the polymeric layer.

Embodiment 40 is the article of any of embodiments 36-39, wherein at least one of the first substrate or the second substrate is transmissive to UV radiation at or below the B spectral range.

Embodiment 41 is the article of any of embodiments 36-39, wherein neither the first substrate nor the second substrate is transmissive to UV radiation at or below the B spectral range, and wherein the modified polymer layer further comprises a means for transporting UV radiation at or below the B spectral range by total internal reflection.

Embodiment 42 is the article of embodiment 28, wherein the article comprises a composite article comprising: the modified polymer composition; and at least one additional copolymer, wherein the modified polydiorganosiloxane polyoxamide copolymer is at least partially depolymerized by exposure to UV radiation at or below the B spectral range.

Embodiment 43 is the article of embodiment 42, wherein the modified polydiorganosiloxane polyoxamide copolymer is at least partially removable from the composite article.

Embodiment 44 is the article of embodiment 43, wherein the polydiorganosiloxane polyoxamide copolymer is at least partially removable from the composite article by pouring, vacuum removal, or wiping.

Embodiment 45 is the article of any of embodiments 42-44, wherein the composite article is disposed on a substrate.

Embodiment 46 is the article of any of embodiments 42-44, wherein the composite article is a free standing three dimensional article.

Embodiment 47 is the article of embodiment 46, wherein the article is prepared by three dimensional printing.

EXAMPLES

Polydiorganosiloxane Polyoxamide Copolymers were modified by exposure to ultraviolet light. These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo. unless otherwise noted. Conventional abbreviations are used herein, including cm=centimeters; J=Joules; mW=milliWatts; and mol=moles.

Test Methods

H-NMR Spectrum

Proton nuclear magnetic resonance ($^1$H NMR) was used in order to determine the structure of the molecules of the samples. The measurements were conducted with a Varian Inova 600 MHz NMR spectrometer equipped with an inverse probe head (manufactured by Varian Associates, Palo Alto, Calif., USA).

Tack/Adhesion Comparison

Tack is the tendency for a substance to stick on contact with another. Tack differences were evaluated by touching treated and untreated sample surfaces with a gloved finger. The pull force (adhesion) differences of treated and untreated samples were evaluated by hand peeling samples from substrates.

FTIR Spectrum

Fourier Transform Infrared Spectroscopy (FTIR) was used in order to determine the structure of the N—H stretch of the oxamide moiety of the samples. The measurements were conducted with a Nicolet 380 FT-IR (Thermo Scientific, Waltham, Mass., USA).

| Table of Abbreviations | |
|---|---|
| Abbreviation or Trade Designation | Description |
| 3K PDMS diamine | A polydimethylsiloxane diamine with an average molecular weight of about 2,500 grams/mole that was received from Wacker AG, Munich Germany as WACKER FLUID NH 40 D. Amine equivalent weight (AEW) of 1250 grams/equivalent. |
| 14K PDMS dioxamido ester | A polydimethylsiloxane dioxamido ester prepared as described in Preparative Example 5 U.S. Pat. No. 7,501,184. |
| Elastomer 1 | A polydimethylsiloxane polyoxamide elastomer prepared as described in Example 16 in U.S. Pat. No. 7,501,184 |
| PSA 1 | A pressure sensitive adhesive of 20% solids solution of 50 parts polydimethylsiloxane polyoxamide elastomer prepared as described in Example 16 and Preparative Example 5 in U.S. Pat. No. 7,501,184 (ester equivalent weight of 20,010 grams/equivalent) and 50 parts MQ-RESIN POWDER 803 TF available from Wacker AG, Munich Germany in 70/30 weight % respectively of Toluene and isopropyl alcohol. |
| PET Film | Polyester film of polyethylene terephthalate. |

Preparative Example P-1

A 0.0403 gram sample of Elastomer 1 was dissolved in 0.83 grams of $CDCl_3$ and added to an NMR tube. The $^1$H-NMR spectrum of the Elastomer 1 was acquired and showed a majority of the protons assigned to the PDMS methyl protons at near 0.06 ppm. The remaining protons corresponded to protons located in or adjacent to the oxamide hard segment.

Example 1A

A 0.040 gram sample of Elastomer 1 was placed on a watch glass. The watch glass was placed under a 15 W germicidal lamp (available from Sankyo Denki G15T8 bi-pin) with an output of ~3.8 mW/cm$^2$ as measured with a UV POWER PUCK II (available from EIT Inc., Sterling, Va., USA). The sample was exposed for 24 hours (dose=~325 J/cm$^2$) at which time a substantial portion of the elastomer had been liquefied. The liquid was dissolved in CDCl$_3$ and added to an NMR tube. The $^1$H-NMR of modified Elastomer 1 was acquired and the peaks showed that all the protons associated with the hard oxamide region were not present. The majority of the protons were assigned as being associated with the PDMS backbone. A large peak at ~1.6 was assigned as water condensed during sample preparation.

Example 1B

An approximately 1 inch×2 inch×0.002 inch (2.5 cm×5.1 cm×51 micrometers) film of Elastomer 1 was mounted onto a FTIR transmission sample holder. An initial FTIR spectrum (Nicolet 380 FT-IR, Thermo Scientific, Waltham, Mass., USA) was taken followed by exposure of the sample to UVC by the 15 W germicidal lamp described in Example 1A. The sample was irradiated for 5 minutes in air and then a FTIR spectrum taken with monitoring of the amide peak at 3302 cm$^{-1}$. The process was repeated in 5 minute exposure increments until the sample degraded to failure. The progressive loss of the amide was observed.

Example 2

A 2 inch×3 inch×0.014 inch (5.1 cm×7.6 cm×0.036 cm) piece of GORILLA Glass (Corning Inc., Corning, N.Y., USA) was cleaned with isopropyl alcohol and allowed to air dry. To the glass piece was laminated to a 0.004 inch (102 micrometer) thick film of Elastomer 1 with a PET backing film. The sample was heated in a hot-air oven for one hour at 80° C. and allowed to cool to room temperature. One-half of the front of the glass surface was covered with black electrical tape as a masking material and the sample was exposed to a 15 W germicidal lamp (available from Sankyo Denki G15T8 bi-pin) with an output of ~3.8 mW/cm$^2$ as measured with a UV POWER PUCK II (available from EIT Inc., Sterling, Va., USA). After 2 hours of exposure (dose=~27 J/cm$^2$), the sample was removed. A corner of the film was peeled back and a comparison made of the exposed and unexposed regions. The force required to peel the film from the glass on the UVC exposed half of the sample was significantly less compared to the unexposed half.

Example 3

A 2 inch×3 inch×0.014 inch (5.1 cm×7.6 cm×0.036 cm) piece of GORILLA Glass (Corning Inc., Corning, N.Y., USA) was cleaned with isopropyl alcohol and allowed to air dry. To the glass piece was laminated to a 0.004 inch (102 micrometer) thick film of PSA 1 with a PET backing film. One-half of the front of the glass surface was covered with black electrical tape as a masking material and the glass side of the sample was exposed to a 15 W germicidal lamp (available from Sankyo Denki as G15T8 bi-pin) with an output of ~3.8 mW/cm$^2$ when measured with a UV POWER PUCK II (available from EIT Inc., Sterling, Va., USA). After 2 hours of exposure (dose=~27 J/cm$^2$), the sample was removed. A corner of the film was peeled back and a comparison made of the exposed and unexposed regions. The force required to peel the film from the glass on the UVC exposed half of the sample was noticeably less compared to the unexposed half.

Example 4

To a flame dried, clear, glass jar was added 116.82 grams (4.65×10$^{-2}$ mol) of 14K PDMS dioxamido ester and 524.89 grams (4.65×10$^{-2}$ mol) of 3K PDMS diamine. The jar was capped, vigorously shaken to combine and placed on a roller mill. After 16 hours, the lid was removed and the jar placed in a hot-air oven at 80° C. for 48 hours to yield 639.1 grams of 14K:3K polydimethylsiloxane polyoxamide gum. A 0.062 gram sample of 14K:3K polydimethylsiloxane polyoxamide gum was placed on a watch glass. The watch glass was placed under a 15 W germicidal lamp (available from Sankyo Denki G15T8 bi-pin) with an output of ~3.8 mW/cm$^2$ as measured with a UV POWER PUCK II (available from EIT Inc., Sterling, Va., USA). The sample was exposed for 2 hours (dose=~27 J/cm$^2$) at which time a substantial portion of the gum had been liquefied.

Example 5

A PET film with a 6 micrometer coating of PSA 1 was exposed to an E-beam process (CB-300 model available from Energy Sciences Inc. from Wilmington, Mass., nitrogen atmosphere, accelerating voltage of 220 kV, dose=16 MRad) to chemically crosslink PSA 1. The surface of the crosslinked PSA 1 was soft, rubbery with a slight tack. The PSA 1 surface of a 1 inch×4 inch (2.5 cm×102 cm) sample of the film was exposed to a 15 W germicidal lamp (available from Sankyo Denki as G15T8 bi-pin) with an output of ~3.8 mW/cm$^2$ when measured with a UV POWER PUCK II (available from EIT Inc., Sterling, Va., USA). After 4 hours of exposure (dose=~55 J/cm$^2$), the sample was removed. The UVC exposed PSA 1 sample was significantly more tacky than the unexposed PSA 1

Example 6

An approximately 1 inch×1 inch×0.040 inch (2.5 cm×2.5 cm×0.10 cm) sample of a Elastomer 1/PC blend (20 wt % Elastomer 1 blended with MAKROLON OD2015 available from Bayer Material Science) was exposed to a 15 W germicidal lamp (available from Sankyo Denki as G15T8 bi-pin) with an output of ~3.8 mW/cm$^2$ as measured with a UV POWER PUCK II (available from EIT Inc., Sterling, Va., USA). After 24 hours of exposure (dose=~325 J/cm$^2$), the sample was removed. The exposed surface was tested by swiping the surface with a gloved finger. The surface was easily marred and a greasy residue was visually apparent on the glove surface.

Comparative Example C1

A 0.010 inch (0.0254 cm) thick film of a 2-part platinum cured silicone (available from Dow Corning, Midland Mich. as SYLGARD 184) with a PET backing film was exposed to a 15 W germicidal lamp (available from Sankyo Denki as G15T8 bi-pin) with an output of ~3.8 mW/cm² when measured with a UV POWER PUCK II (available from EIT Inc., Sterling, Va., USA). After 48 hours of exposure (dose=~655 J/cm²), the sample was removed. The top surface of the exposed surface was compared to an unexposed area. No obvious difference between the two surfaces could be determined by visual or physical inspection.

Comparative Example C2

A 0.010 inch (0.0254 cm) thick film of a silicone polyurea elastomer (prepared as Example 6 in U.S. Pat. No. 5,512,650) was exposed to a 15 W germicidal lamp (available from Sankyo Denki as G15T8 bi-pin) with an output of ~3.8 mW/cm² when measured with a UV POWER PUCK II (available from EIT Inc., Sterling, Va., USA). After 48 hours of exposure (dose=~655 J/cm²), the sample was removed. The top surface of the exposed surface was compared to an unexposed sample of polyurea elastomer. There were no obvious difference between the two samples that could be determined visually. Swiping the surface with a gloved finger did not mar the surface or transfer an oily residue to the glove surface.

What is claimed is:

1. A method of modifying a polymeric composition comprising:
    providing a polymeric composition comprising a polydiorganosiloxane polyoxamide copolymer; and
    exposing the polymeric composition to UV radiation at or below the B spectral range to effect de-polymerization of at least a portion of the polydiorganosiloxane polyoxamide copolymer.

2. The method of claim 1, wherein the polymeric composition comprises at least one polymeric layer.

3. The method of claim 2, further comprising a substrate wherein the polymeric layer is disposed on a substrate.

4. The method of claim 3, wherein the at least one polymeric layer comprises a pressure sensitive adhesive.

5. The method of claim 4, wherein de-polymerization of at least a portion of the polydiorganosiloxane polyoxamide copolymer pressure sensitive adhesive layer causes the portion of the polydiorganosiloxane polyoxamide copolymer to become non-pressure sensitive.

6. The method of claim 3, wherein the polymeric layer comprises a release layer.

7. The method of claim 3, wherein the polymeric layer comprises a polymeric coating layer.

8. The method of claim 7, wherein the polymeric coating layer further comprises at least one additive selected from tackifying resins, plasticizing resins, fillers, microparticles, nanoparticles, pigments, dyes, heat transfer particles, magnetic transfer particles, stabilizers, or combinations thereof.

9. The method of claim 3, wherein the polymeric layer comprising the polydiorganosiloxane polyoxamide copolymer comprises a non-adhesive crosslinked polymeric layer and de-polymerization of at least a portion of the polydiorganosiloxane polyoxamide copolymer causes the portion of the polydiorganosiloxane polyoxamide copolymer to become an adhesive.

10. The method of claim 1, wherein exposing the polymeric layer to UV radiation at or below the B spectral range to effect de-polymerization of at least a portion of the polydiorganosiloxane polyoxamide copolymer comprises selective exposure of a discrete portion of the polymeric layer.

11. The method of claim 1, wherein the polymeric composition comprises a composite composition comprising the polydiorganosiloxane polyoxamide copolymer and at least one other polymeric material.

12. The method of claim 1, wherein the polymeric composition comprises a free standing three dimensional article.

13. A modified polymer composition comprising:
    the reaction product of:
        a polydiorganosiloxane polyoxamide copolymer; and
        UV radiation at or below the B spectral range.

14. The composition of claim 13, wherein the reaction product comprises silanol functional groups that were not present in the polydiorganosiloxane polyoxamide copolymer prior to exposure to UV radiation at or below the B spectral range.

15. An article comprising:
    a modified polymer composition comprising:
        the reaction product of:
            a polydiorganosiloxane polyoxamide copolymer; and
            UV radiation at or below the B spectral range,
                wherein the polydiorganosiloxane polyoxamide copolymer is modified by de-polymerization.

16. The article of claim 15, wherein the article further comprises at least one additional component to form a multi-component article, a composite article, or a combination thereof.

17. The article of claim 16, wherein the article comprises a multi-component article comprising:
    a first substrate with a first major surface and a second major surface; and
    a modified polymeric layer disposed on the first major surface of the first substrate,
wherein the modified polymeric layer comprises the modified polymer composition.

18. The article of claim 17, further comprising a second substrate with a first major surface and a second major surface, wherein the second major surface of the second substrate is in contact with modified polymeric layer.

19. The article of claim 18, wherein the first substrate is not removable from the modified polymeric layer until after modification of the polymeric layer.

20. The article of claim 16, wherein the article comprises a composite article comprising:
    the modified polymer composition; and
    at least one additional copolymer,
wherein the modified polydiorganosiloxane polyoxamide copolymer is at least partially de-polymerized by exposure to UV radiation at or below the B spectral range.

21. The article of claim 20, wherein the modified polydiorganosiloxane polyoxamide copolymer is at least partially removable from the composite article.

22. The article of claim 20, wherein the composite article is a free standing three dimensional article.

* * * * *